(12) United States Patent
Wuthishuwong

(10) Patent No.: US 11,225,284 B2
(45) Date of Patent: Jan. 18, 2022

(54) METHOD AND DEVICE FOR ESTIMATING A STEERING TORQUE

(71) Applicant: Aptiv Technologies Limited, St. Michael (BB)

(72) Inventor: Chairit Wuthishuwong, Wuppertal (DE)

(73) Assignee: Aptiv Technologies Limited, St. Michael (BB)

(*) Notice: Subject to any disclaimer, the term of this patent is extended or adjusted under 35 U.S.C. 154(b) by 98 days.

(21) Appl. No.: 16/208,796

(22) Filed: Dec. 4, 2018

(65) Prior Publication Data

US 2019/0185053 A1 Jun. 20, 2019

(30) Foreign Application Priority Data

Dec. 20, 2017 (EP) .................................... 17209114

(51) Int. Cl.
*B62D 6/00* (2006.01)
*G05B 17/02* (2006.01)
(Continued)

(52) U.S. Cl.
CPC .............. *B62D 6/00* (2013.01); *B62D 6/008* (2013.01); *G05B 17/02* (2013.01); *G07C 5/08* (2013.01);
(Continued)

(58) Field of Classification Search
CPC .................................. B62D 6/00; B62D 6/008
(Continued)

(56) References Cited

U.S. PATENT DOCUMENTS 5,979,581 A 11/1999 Ravani et al.
6,185,492 B1 2/2001 Kagawa et al.
(Continued)

FOREIGN PATENT DOCUMENTS

CN 1795120 6/2006
CN 1891552 1/2007
(Continued)

OTHER PUBLICATIONS

NPL, Hsu, J.; Laws, S.M.; Gerdes, J.C. Estimation of Tire Slip Angle and Friction Limits Using Steering Torque. IEEE Trans. Control Syst. Technol. 2010, 18, 896-907 (hereinafter "HSU").*
(Continued)

*Primary Examiner* — Jean Paul Cass
(74) *Attorney, Agent, or Firm* — Colby Nipper PLLC

(57) ABSTRACT

Method for estimating a steering torque, in particular for the lateral control of a vehicle, comprising the steps of detecting at least one signal on a current vehicle state and/or current vehicle environment, determining a desired steering angle by a steering control unit based on the at least one detected signal, estimating a vehicle lateral force on the basis of a tire dynamics model, including the determined steering angle as an input factor, estimating a vehicle lateral force on the basis of a lateral dynamics model, correcting the lateral force value estimated by the tire dynamics model on the basis of the lateral force value estimated by the lateral dynamics model, estimating a self-aligning torque based on the corrected lateral force value, and estimating a steering torque from the estimated self-aligning torque.

20 Claims, 6 Drawing Sheets

(51) Int. Cl.
*G07C 5/08* (2006.01)
*G05D 1/02* (2020.01)

(52) U.S. Cl.
CPC ..... *G05D 1/021* (2013.01); *G05D 2201/0213* (2013.01)

(58) Field of Classification Search
USPC .......................................................... 701/41
See application file for complete search history.

(56) References Cited

U.S. PATENT DOCUMENTS

| | | | |
|---|---|---|---|
| 6,212,453 | B1 | 4/2001 | Kawagoe et al. |
| 6,487,501 | B1 | 11/2002 | Jeon et al. |
| 6,542,800 | B2 | 4/2003 | Kawazoe et al. |
| 6,754,615 | B1 * | 6/2004 | Germann ................. G06F 30/23 703/8 |
| 6,778,890 | B2 | 8/2004 | Shimakage et al. |
| 7,711,464 | B2 | 5/2010 | Kaufmann |
| 8,170,739 | B2 | 5/2012 | Lee |
| 9,150,246 | B2 | 10/2015 | Lee et al. |
| 9,221,508 | B1 * | 12/2015 | de Haan ................... B60N 2/01 |
| 9,688,308 | B2 * | 6/2017 | Lee ....................... B60W 30/10 |
| 2007/0074565 | A1 * | 4/2007 | Jayakumar ............ B60C 99/006 73/146 |
| 2008/0091318 | A1 | 4/2008 | Deng et al. |
| 2010/0228420 | A1 | 9/2010 | Lee |
| 2012/0166154 | A1 * | 6/2012 | Johnson .............. G01M 13/025 703/2 |
| 2013/0144476 | A1 * | 6/2013 | Pinto ................... B60T 8/17555 701/22 |
| 2013/0173115 | A1 | 7/2013 | Gunia et al. |
| 2013/0231830 | A1 | 9/2013 | Van Dan Elzen et al. |
| 2015/0158524 | A1 * | 6/2015 | Lee .......................... B62D 1/28 701/41 |
| 2016/0288831 | A1 * | 10/2016 | Lee ....................... B60W 30/10 |
| 2018/0273046 | A1 * | 9/2018 | Berntorp ............... B60W 40/12 |
| 2019/0185053 | A1 * | 6/2019 | Wuthishuwong ...... G05B 17/02 |
| 2019/0233005 | A1 * | 8/2019 | Maeda ..................... B62D 6/04 |
| 2019/0310162 | A1 * | 10/2019 | Pfeiffer ............. G01M 17/0072 |

FOREIGN PATENT DOCUMENTS

| | | |
|---|---|---|
| CN | 101512531 | 8/2009 |
| CN | 106476653 | 3/2017 |
| DE | 102010042135 A1 | 4/2012 |
| DE | 102014224392 | 6/2016 |
| EP | 1074904 | 11/2002 |
| EP | 2105371 | 6/2010 |
| JP | H10965 | 1/1998 |

OTHER PUBLICATIONS

"Foreign Office Action", CN Application No. 201811547466.8, dated Dec. 10, 2020, 21 pages.

Hoffmann, et al., "Autonomous Automobile Trajectory Tracking for Off-Road Driving: Controller Design, Experimental Validation and Racing", Jul. 2007, 6 pages.

Kiencke, et al., "Automotive control systems: for engine, driveline, and vehicle", Springer, 2000, 2000, 521 pages.

Paden, et al., "A Survey of Motion Planning and Control Techniques for Self-driving Urban Vehicles", Apr. 25, 2016, 27 pages.

Rajamani, "Vehicle Dynamics and Control", Springer Science & Business Media, 2011, 2011, 523 pages.

Snider, "Automatic Steering Methods for Autonomous Automobile Path Tracking", Feb. 2009, 78 pages.

* cited by examiner

METHOD AND DEVICE FOR ESTIMATING A STEERING TORQUE

TECHNICAL FIELD OF INVENTION

The present invention refers to a method and a device for estimating a steering torque, in particular for the lateral control of a vehicle.

BACKGROUND OF INVENTION

Advanced Driver Assistant Systems (ADAS) and automated driving concepts, such as fully or semi-autonomous driving systems, provide assistance to a driver in different driving situations or allow to stabilize and/or control a vehicle in a longitudinal and/or lateral orientation.

As regards the lateral control of a vehicle, for example, Lane Keeping Assist Systems (LKAS) or auto pilots for autonomous driving are known which may actively turn a steering wheel to make a vehicle move towards a desired travel course by compensating the difference between a current heading direction, a detected road curvature, and a lateral offset to the respective lane center. Steering control is the crucial part of keeping a vehicle moving on a desired travel course. Accordingly, the lateral control of a vehicle requires determining a desired steering angle, which is appropriate for realizing the desired travel course of the vehicle.

By determining merely a desired steering angle, the respective steering system may attempt to reach said steering angle with a maximum possible steering torque. However, this steering torque may be higher than a permissible or adequate limit for such steering torque, which may, for example, be defined at +/−3 Nm for safety and/or comfort reasons. Current Advanced Driver Assistant Systems (ADAS) and also autonomous driving systems—at least semi-autonomous systems—may still require a driver's hand on the steering wheel for overriding in case of an unexpected driving situation. If the level of torque a driver has to apply instantaneously is high, in particular higher than 3 Nm, the driving comfort and/or safety may be affected.

Furthermore, most of the steering systems such as electric power steering systems may only be provided with torque as an input signal. Inputting merely a steering angle may therefore not be sufficient. Finally, the steering angle as an input factor limits the handling properties of a vehicle. To reach the same desired steering angle, different torque values may be necessary dependent on the respective driving conditions. The road surface, vehicle speed, and or the tire properties and conditions may influence the required steering torque for realizing a specific steering angle. At the same time, if the desired steering angle is attempted to be reached with an inappropriate steering torque, the vehicle may lose grip.

SUMMARY OF THE INVENTION

In view of the above, it has been an object of the present invention to provide a method for estimating a steering torque with a high level of accuracy and only limited calculating effort. It has also been an object to provide a device for estimating a steering torque.

With regard to the method, this objective has been solved by the features of new claim 1. A device for estimating a steering torque is subject to claim 15. Further embodiments of the invention are referred to in the dependent claims.

A method for estimating a steering torque according to the present invention comprises the steps of detecting at least one signal on a current vehicle state and/or current vehicle environment, determining a desired steering angle by a steering control unit based on the at least one detected signal, estimating a vehicle lateral force on the basis of a tire dynamics model, including the determined steering angle as an input factor, estimating a vehicle lateral force on the basis of a lateral dynamics model, correcting the lateral force value estimated by the tire dynamics model on the basis of the lateral force value estimated by the lateral dynamics model, estimating a self-aligning torque based on the corrected lateral force value, and estimating a steering torque from the estimated self-aligning torque.

The estimated steering torque may be used for the lateral control of a vehicle or for driver assistance, such as for providing a warning signal to a driver.

The step of detecting a signal on a current vehicle state and/or current vehicle environment may conducted by a respective sensor or by a plurality of sensors. The current vehicle state, including a vehicle position, orientation, speed and the respective rate of change may be detected by a GPS unit and/or an inertial measurement unit (IMU). The vehicle environment, such as static or dynamic obstacles or lane markers, may be detected by a camera, radar, LIDAR and/or ultrasonic sensor.

The detected signal or the plurality of detected signals may then be used for determining a desired steering angle. This operation is particularly conducted by a steering control unit, and by applying an appropriate calculation model. The desired steering angle may subsequently be used as an input factor for estimating a vehicle lateral force on the basis of a tire dynamics model. Independently of the tire dynamics model, a vehicle lateral force is estimated on the basis of a lateral dynamics model. The lateral force value estimated by the tire dynamics model is then corrected on the basis of the lateral force value estimated by the lateral dynamics model. A self-aligning torque is estimated based on the corrected lateral force value. Finally, a steering torque may be estimated from the estimated self-aligning torque.

In particular, the self-aligning torque may correspond to a counter torque for correcting a tire slip angle, whereas the steering torque may correlate in a specific relationship to the required counter torque, allowing to estimate the steering torque.

According to an embodiment of the present invention, the method further comprises the step of estimating a tire slip angle, wherein the determined steering angle provides an input factor for said tire slip angle estimation and/or wherein the step of estimating the vehicle lateral force on the basis of the tire dynamics model includes the estimated tire slip angle as an input factor. Thereby, the accuracy of the lateral force estimation on the basis of the tire dynamics model may be improved.

The step of estimating the slip angle may be conducted on the basis of a slip angle model, which is, for example, based on the equations:

$$\alpha_F(k) = -\beta(k) + \delta_w(k) - \frac{l_F \dot{\psi}(k)}{v_x(k)}$$

and $$\alpha_R(k) = -\beta(k) + \frac{l_R \dot{\psi}(k)}{v_x(k)}$$

where $\alpha_F$ represents the tire slip angle of the front axle,
$\alpha_R$ represents the tire slip angle of the rear axle,
$\beta$ represents the angle of the vehicle body relative to the travel direction,
$\delta_w$ represents the steering angle,
$l_F$ represents the distance between the vehicle center of gravity and the front axle,
$l_R$ represents the distance between the vehicle center of gravity and the rear axle,
$\dot{\psi}$ represents the yaw rate,
$v_x$ represents the vehicle longitudinal velocity, and
k represents a discrete time sequence.

Such calculation allows to accurately estimate the slip angle with only little computation effort. The values for $l_F$ and $l_R$ may be substantially fix and known for the respective vehicle. Variations regarding the center of gravity due to loading may be considered or neglected. The values for $\beta$, $\dot{\psi}$, and $v_x$ may be measured by sensors online during driving. The value for $\delta_w$ may be the desired steering angle previously determined.

According to a further embodiment, the tire dynamics model is a Pacejka model, for example, based on the equations:

$$\hat{F}_{yF}(k) = D \sin(C \tan^{-1}(B\alpha_F - E(B\alpha_F - \tan^{-1}(B\alpha_F))))$$

and $$\hat{F}_{yR}(k) = D \sin(C \tan^{-1}(B\alpha_R - E(B\alpha_R - \tan^{-1}(B\alpha_R)))),$$

where $\hat{F}_{yF}$ represents the tire lateral force of the front axle,
$\hat{F}_{yR}$ represents the tire lateral force of the rear axle,
$\alpha_F$ represents the tire slip angle of the front axle,
$\alpha_R$ represents the tire slip angle of the rear axle,
k represents a discrete time sequence, and
B, C, D and E represent fitting coefficients.

Such a Pacejka model provides a rather high level of accuracy with an acceptable amount of computation effort, which is still possible to provide continuously during the driving of a vehicle. The values for $\alpha_F$ and $\alpha_R$ may be determined via the slip angle estimation mentioned above. The values for B, C, D and E may be obtained offline for respective road conditions, such as the properties of the road surface. The values for B, C, D and E may in particular represent dry, wet or snow covered road surfaces, and also different road surface materials such as concrete, asphalt or cobblestone.

The method according to the present invention may further comprise the step of estimating a yaw acceleration, wherein the step of estimating the vehicle lateral force on the basis of the lateral dynamics model may include the estimated yaw acceleration as an input factor. Thereby, the accuracy of the lateral force estimation on the basis of the lateral dynamics model may be improved.

The step of estimating the yaw acceleration may be conducted on the basis of a backward Euler method, for example, based on the equation:

$$\ddot{\psi}(k) = \frac{\dot{\psi}(k) - \dot{\psi}(k-1)}{T_s}$$

where $\ddot{\psi}$ represents the yaw acceleration,
$\dot{\psi}$ represents the yaw rate, and $T_s$ represents a sampling period or resolution, and
k represents a discrete time sequence.

Based on the backward Euler method, in particular based on the equation above, the yaw acceleration may be estimated accurately and with only little computation effort.

According to yet a further embodiment, the step of estimating the vehicle lateral force on the basis of a lateral dynamics model is conducted independent from the desired steering angle determined by the steering control unit. In this case, the desired steering angle is not required as an input factor for the lateral dynamics model, whereby computation may be simplified accordingly conducted with reduced effort, while at the same time a sufficient level of accuracy may be ensured.

The lateral dynamics model may be a single track model, for example, based on the equations:

$$Ma_y(k) = F_{yF}(k) + F_{yR}(k)$$

and $$I_z \ddot{\psi}(k) = l_F F_{yF}(k) - l_R F_{yR}(k)$$

where
M represents the vehicle mass,
$a_y$ represents the vehicle lateral acceleration,
$F_{yF}$ represents the tire lateral force of the front axle,
$F_{yR}$ represents the tire lateral force of the rear axle,
$I_z$ represents the vehicle rotation moment of inertia,
$\ddot{\psi}$ represents the yaw acceleration, and
k represents a discrete time sequence.

Such a single track model provides a high level of accuracy with only little computation effort. The values for M and $I_z$ may be substantially fix and known for the respective vehicle. Variations regarding the mass and/or the rotation moment of inertia due to loading may be considered or neglected. The values for $a_y$ and $\ddot{\psi}$ may be measured by sensors online during driving.

According to yet a further embodiment, the step of correcting the lateral force value is conducted by an observer. The observer may, for example, be a linear observer, such as a Luenberger-Observer. Also, other types of observers may be used, for example, non-linear observers. Using an observer for correcting the lateral force value is simple and effective in achieving a higher degree of accuracy with only little computation effort.

Furthermore, the step of correcting the lateral force value may comprise the detection of an error value between the lateral force value estimated by the tire dynamics model and the lateral force value estimated by the lateral dynamics model, and the multiplication of the error value by an observer gain for receiving a correction value. The correction value may then be taken as a basis for correcting the lateral force value estimated by the tire dynamics model in a subsequent sampling time sequence. The multiplication of the error value with the observer gain may be conducted by an observer mentioned above. The step of correcting the lateral force value estimated by the tire dynamics model may thus be conducted in a particularly robust manner.

According to yet a further embodiment, the method may further comprise the step of estimating a pneumatic trail, wherein the step of estimating the self-aligning torque may include the estimated pneumatic trail as an input factor. The pneumatic trail may facilitate the estimation of the self-aligning torque, particularly, once the vehicle lateral force is known or adequately estimated.

The step of estimating the pneumatic trail may conducted on the basis of a pneumatic trail model, which is, for example, based on the equation:

$$t_p = -\left(\frac{T_{SAT}}{F_y}\right)_{a \to 0} = \frac{1}{3}a$$

where $t_p$ represents the pneumatic trail,
$T_{SAT}$ represents the self-aligning torque,
$F_y$ represents the corrected lateral force, and
a represents the length of the contact surface between tire and road in a longitudinal orientation.

This equation above allows an effective calculation of the self-aligning torque. Once the vehicle lateral force is known or adequately estimated, a sufficient estimation of the self-aligning torque may be conducted on the basis of the factor a, which represents the length of the contact surface between tire and road in a longitudinal orientation. That is, once the tire touches the road surface, a small area around the contact point between tire and vehicle, known as contact patch, is established. The size of the area in question is the tire width multiplied with the patch length a. The value for a, may be dependent on the tire characteristics, such as tire size or radial tire design, and current properties, such as air pressure and driving situation. The value for a may be determined offline, in particular by empirical analysis and testing, wherein variable factors for a, such as air pressure, may be considered or neglected.

The steering torque may be derived from the self-aligning torque on the basis of a steering model, which represents a mechanical or electro-mechanical system between the tires and the steering wheel of a vehicle. The steering model may comprise a first order system, for example, a first order lag system. Higher order systems are also applicable. Thereby the modelling of a comparably complex electro-mechanical steering system may be facilitated, while at the same time achieving sufficiently accurate results.

In the first order system, two free parameters may be present, namely the power steering ratio, which is typically a fix value and simple to obtain, and the pole location of the steering system. Electric power steering dynamics can be determined offline using a frequency response method or other methods like empirical data, or may, for example, also be obtained from an OEM. A driver may perform a final adjustment to the first order system in view of the pole location, in order to meet respective requirements, such as the steady state, response time, and/or improve the performance of such system.

A further aspect of the present invention refers to a method for the lateral control of a vehicle, in particular for a passenger car or a truck, comprising the steps of estimating of a steering torque according to the above description, and applying the estimated steering torque to a steering column of said vehicle.

A yet further aspect of the present invention refers to a method for assisting a driver, in particular of a passenger car or a truck, comprising the steps of estimating of a steering torque according to the above description, and outputting a warning signal to the driver in case the estimated steering torque is above a permissible threshold value.

According to yet a further aspect of the present invention, a device for estimating a steering torque, in particular for the lateral control of a vehicle, comprises a detecting means for detecting at least one signal on a current vehicle state and/or current vehicle environment, a control unit for determining a desired steering angle based on the at least one detected signal, an estimation unit for estimating a vehicle lateral force on the basis of a tire dynamics model, including the determined steering angle as an input factor, an estimation unit for estimating a vehicle lateral force on the basis of a lateral dynamics model, a correction unit for correcting the lateral force value estimated by the tire dynamics model on the basis of the lateral force value estimated by the lateral dynamics model, an estimating unit for estimating a self-aligning torque based on the corrected lateral force value, and an estimating unit for estimating a steering torque from the estimated self-aligning torque.

A further aspect of the present invention refers to a steering system for a vehicle, in particular for a passenger car or a truck, with a device according to the above specification.

A yet further aspect of the present invention refers to a vehicle, in particular for a passenger car or a truck, with a device and/or a steering system according to the above specification.

The details mentioned above with regard to the method likewise apply to the device, the steering system and/or the vehicle according to the present invention.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
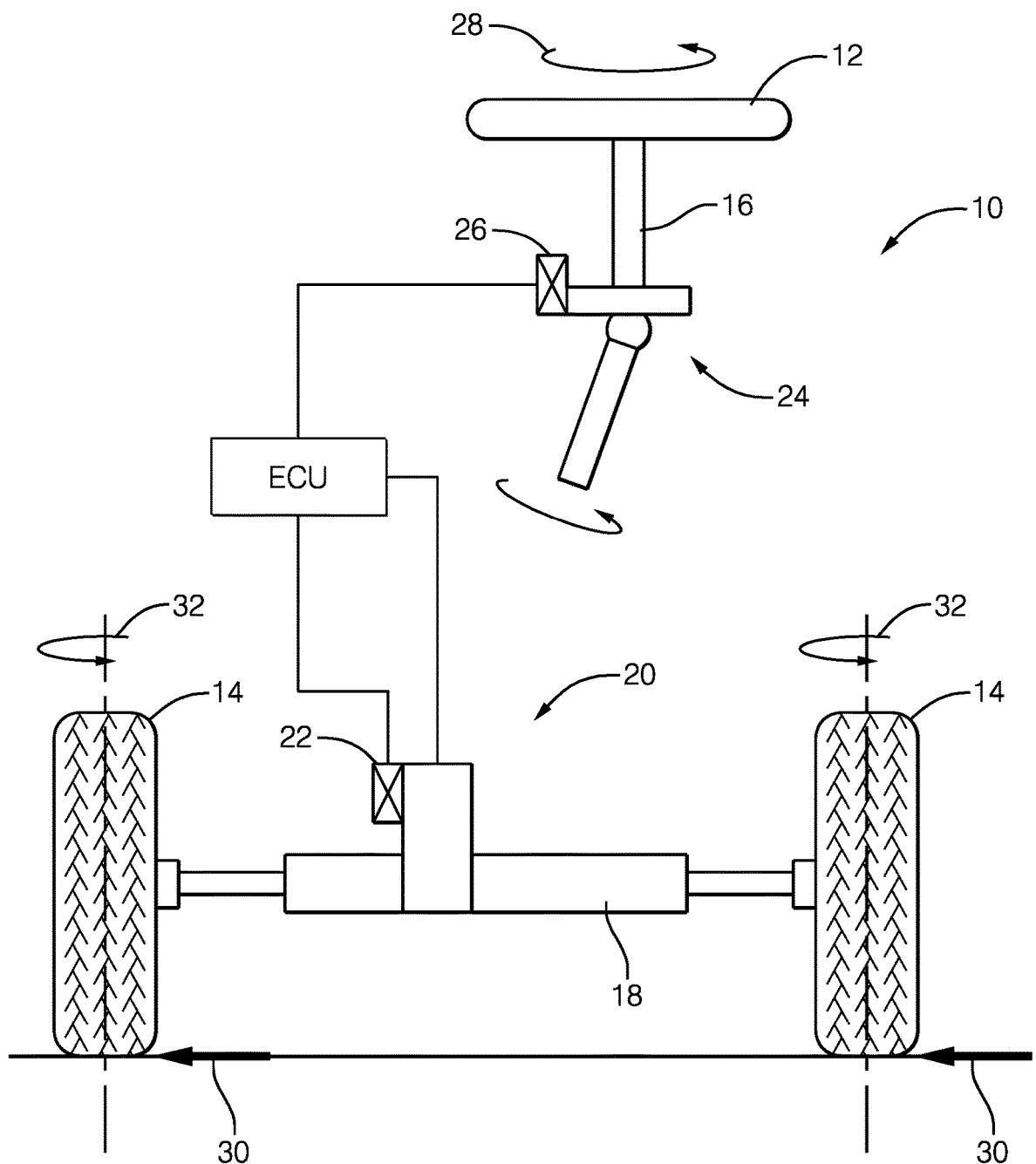
FIG. 1 shows a schematic illustration of a vehicle steering system.

FIG. 1 shows a schematic illustration of a vehicle steering system 10. The vehicle steering system 10 comprises a steering wheel 12 and road wheel 14, wherein the steering wheel 12 is coupled to the road wheels 14 via a steering column 16 and an axle 18. The steering system 10 further includes an electric power steering (EPS) system 20 with an electric steering motor 22 for providing electric steering assistance in response to a driver turning the steering wheel 12. The vehicle steering system 10 may furthermore include an active front steering (AFS) system 24 with an electric motor 26 mounted to the steering column 16. The AFS system 24 may provide additional or corrective steering, for example, during fully or semi-autonomous driving.

In FIG. 1 the steering torque applied to the steering wheel 12 is denoted with reference numeral 28. The steering torque 28 may, for example, be provided by a driver and/or the AFS system 24. During cornering, a lateral force 30 may be exerted onto the road wheels 14. This lateral force may cause a so called self-aligning torque 32.

As may further be comprehended from FIG. 1, the vehicle steering system 10 may also include an electronic control unit ECU, which may provide system control for the EPS system 20 and/or the AFS system 24. The ECU may particularly be configured for conducting a method for estimating a steering torque 28 in accordance with the present invention. The ECU may, inter alia, receive signals from a steering angle sensor and/or a torque sensor not shown here. The steering angle sensor and/or a torque sensor may be mounted to the steering column 16

Figure 2:
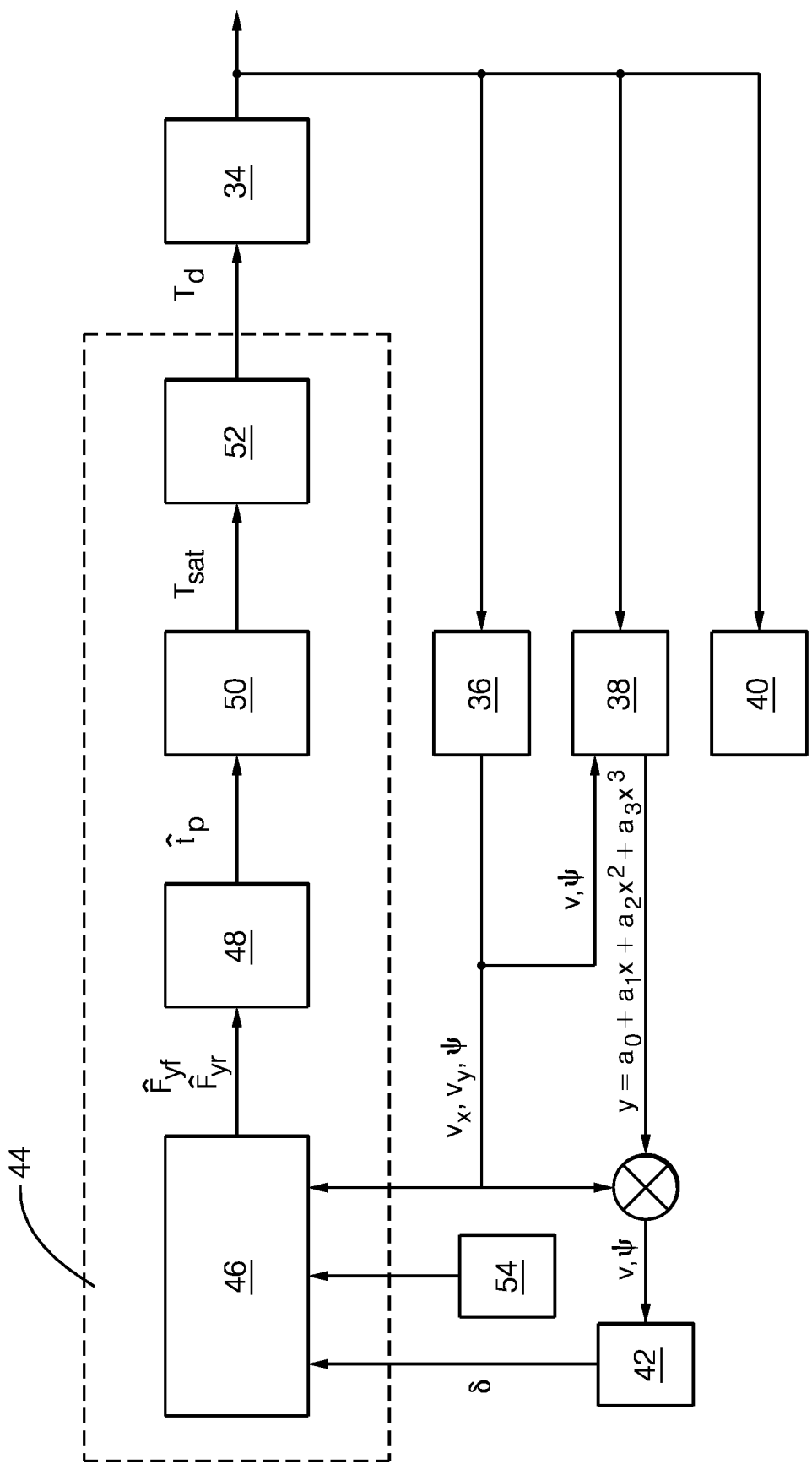
FIG. 2 shows a schematic block diagram for a vehicle lateral control.

FIG. 2 shows a schematic block diagram for a vehicle lateral control according to an embodiment of the present invention. A vehicle is denoted with numeral 34, and may comprise a vehicle steering system 10, as depicted in FIG. 1 and referred to above. The vehicle 34 may also comprise a communication system such as CAN. The current state of the vehicle 34, such as the position, speed, yaw rate and/or orientation, as well as their rates of changing, may be detected with a detecting means 36. The detecting means may comprise a GPS unit and/or an inertial measurement unit (IMU).

The current environment of the vehicle may be detected by detecting means 38 and 40. The detecting means 38 may comprise sensors such as, a camera and/or a Lidar sensor, which may provide information regarding static and/or dynamics obstacles, lane markers and/or road curvature. The detecting means 38 may output a lateral offset, for example, as a value or presented by polynomial coefficients of a polynomial equation. The polynomial equation may be expressed by:

$$y = a_0 + a_1 x + a_2 x^2 + a_3 x^3$$

where
y represents the lateral offset,
x represents the longitudinal distance from the vehicle center, and
$a_0$, $a_1$, $a_2$ and $a_3$ represent coefficients.

The output of detecting means 36 may, for example, be inputted to the detecting means 38. Detecting means 40 may comprise a radar sensor.

The output of the detecting means 36, 38 and 40 may be fed to a control unit 42 for determining a desired steering angle. That is, lateral parameters, lateral offset form the lane center, orientation difference form the lane center, their derivatives and vehicle dynamics parameter such as longitudinal and lateral velocity, yaw and yaw rate may be fed to the control unit 42. The control unit 42 may comprise a Model Predictive Controller (MPC) or any other type of controller, which is particularly configured to determine a desired steering angle δ at a respective time sequence, included current and preview time sequences.

The steps for estimating of a steering torque 28 may be conducted by an estimating system 44, which may include an estimation unit 46 for estimating a vehicle lateral force, an estimating unit 48 for estimating a pneumatic trail value, an estimating unit 50 for estimating a self-aligning torque, and an estimating unit 52 for estimating a steering torque from the estimated self-aligning torque.

Vehicle parameters are denoted with numeral 54, and may be fix or substantially fix values, for example, including the vehicle mass or distances between the front and rear axle to the vehicle center of gravity.

The desired steering angle determined by control unit 42, the vehicle parameters 54 and the output of the detecting means 36 are input to the estimation unit 46.

Figure 3:
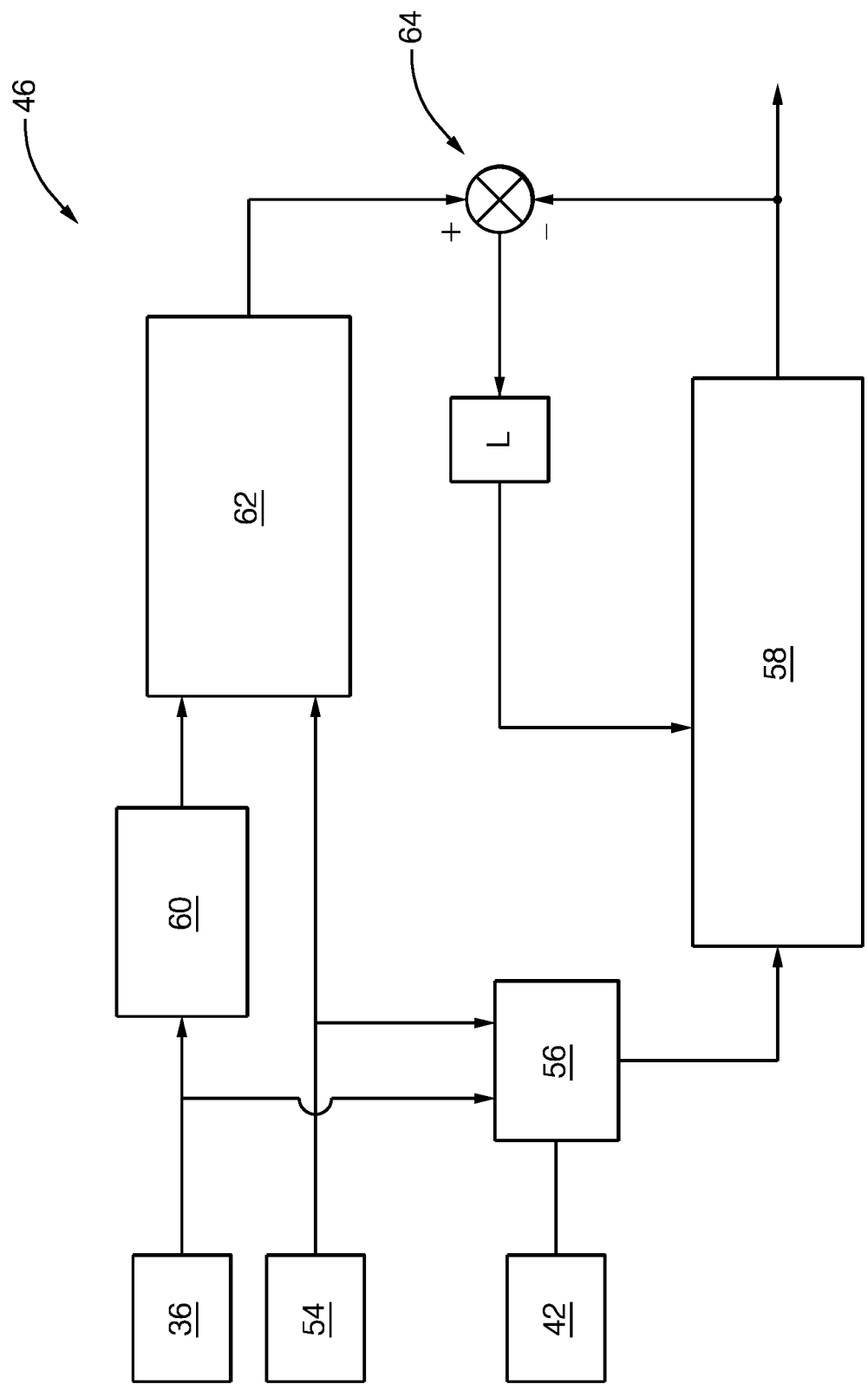
FIG. 3 shows a schematic block diagram for the estimation of a steering torque.

The functionality of the estimating unit 46 is described in greater detail with reference to FIG. 3. A slip angle estimation unit 56 may receive input signals, such as vehicle parameters 54 and signals from the control unit 42 including a desired steering angle. The slip angle estimation unit 56 may also receive vehicle state information from detecting means 36, such as the vehicle longitudinal speed and yaw rate.

Subsequently, the tire slip angle of the front and rear axle may be estimated by the equations:

$$\alpha_F(k) = -\beta(k) + \delta_w(k) - \frac{l_F \dot{\psi}(k)}{v_x(k)}$$

and $$\alpha_R(k) = -\beta(k) + \frac{l_R \dot{\psi}(k)}{v_x(k)}$$

where
$\alpha_F$ represents the tire slip angle of the front axle,
$\alpha_R$ represents the tire slip angle of the rear axle,
$\beta$ represents the angle of the vehicle body relative to the travel direction,
$\delta_w$ represents the steering angle,
$l_F$ represents the distance between the vehicle center of gravity and the front axle,
$l_R$ represents the distance between the vehicle center of gravity and the rear axle,
$\dot{\psi}$ represents the yaw rate, and
$v_x$ represents the vehicle longitudinal velocity, and
k represents a discrete time sequence.

The estimated tire slip angles of the front and rear axle may then be fed to estimating unit 58 for estimating a vehicle lateral force on the basis of a tire dynamics model. The estimating unit 58 may, in particular, include a Pacejka model, which may be expressed by the equations:

$$\hat{F}_{yF}(k) = D \sin(C \tan^{-1}(B\alpha_F - E(B\alpha_F - \tan^{-1}(B\alpha_F))))$$

and $$\hat{F}_{yR}(k) = D \sin(C \tan^{-1}(B\alpha_R - E(B\alpha_R - \tan^{-1}(B\alpha_R)))),$$

where
$\hat{F}_{yF}$ represents the tire lateral force of the front axle,
$\hat{F}_{yR}$ represents the tire lateral force of the rear axle,
$\alpha_F$ represents the tire slip angle of the front axle,
$\alpha_R$ represents the tire slip angle of the rear axle,
k represents a discrete time sequence, and
B, C, D and E represent fitting coefficients.

Figure 7:
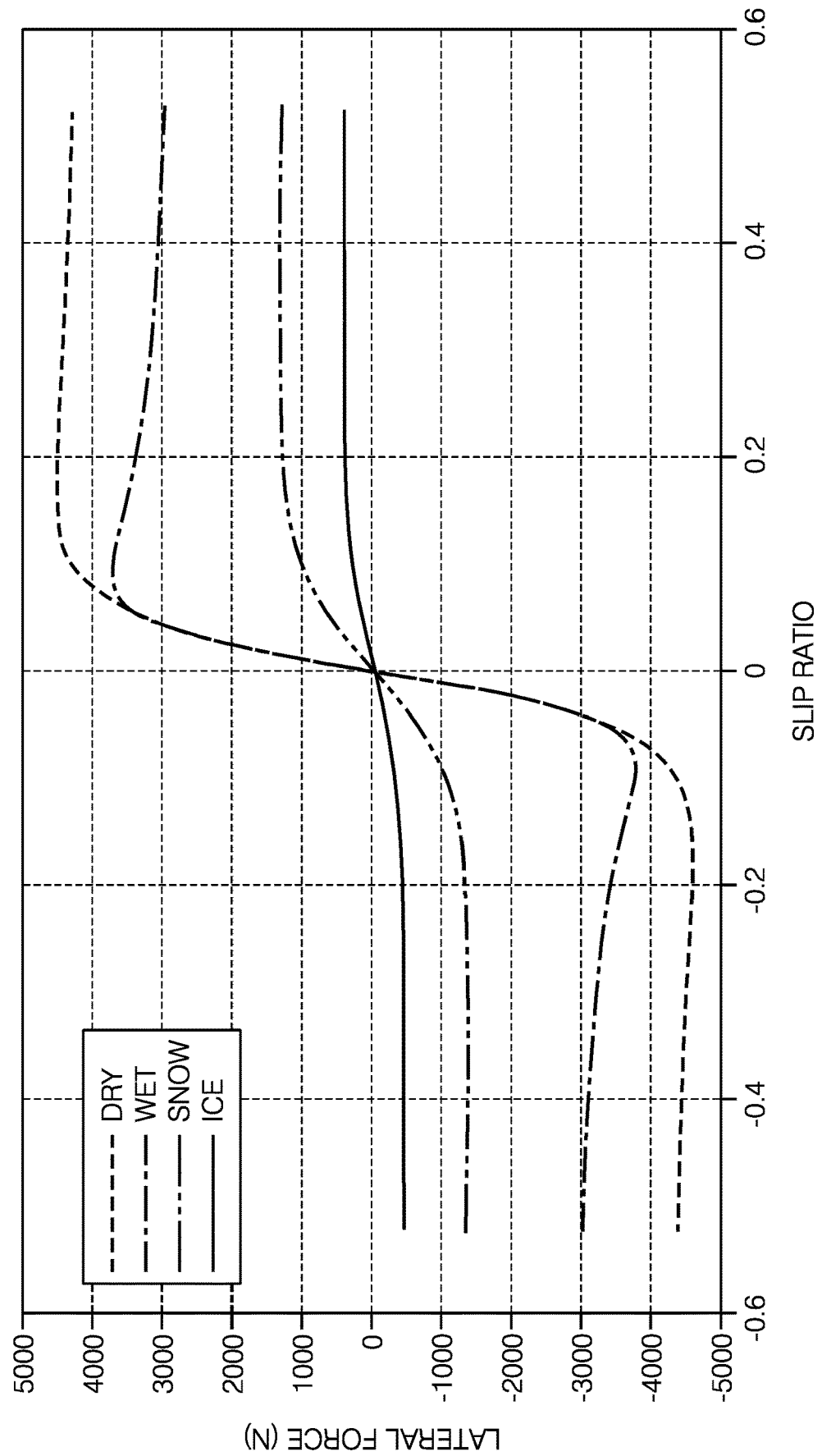
FIG. 7 shows a graph illustrating the relationship between the vehicle lateral force and the slip ration dependent on the road conditions.

The values for B, C, D and E may be obtained offline for any relevant road condition, such as the road surface, dry, wet or snow covered road surfaces, or also different road surface materials such as concrete, asphalt or cobblestone. The relationship between the vehicle lateral force and the slip ratio dependent on the road conditions, including different road materials, is illustrated in FIG. 7. The coefficients B, C, D and E may be obtained from such data set, illustrating the dependency of the road conditions for the slip ratio.

In parallel, a yaw acceleration is estimated by estimation unit 60 by applying a backward Euler formula, which may be expressed by the equation:

$$\ddot{\psi}(k) = \frac{\dot{\psi}(k) - \dot{\psi}(k-1)}{T_s}$$

where
$\ddot{\psi}$ represents the yaw acceleration,
$\dot{\psi}$ represents the yaw rate, and $T_s$ represents a sampling period or resolution,
k represents a discrete time sequence.

The yaw rate as input factor for the estimation unit 60 may be derived from detecting means 36.

Furthermore, an estimation unit 62 estimates the lateral force of both front and rear axle on the basis the lateral dynamics model. In particular, the lateral dynamics model applied by the estimation unit 62 may be a single track model, in particular expressed by the equations:

$$Ma_y(k) = F_{yF}(k) + F_{yR}(k)$$

and $$I_z \ddot{\psi}(k) = l_F F_{yF}(k) - l_R F_{yR}(k)$$

where
M represents the vehicle mass,
$a_y$ represents the vehicle lateral acceleration,
$F_{yF}$ represents the tire lateral force of the front axle,
$F_{yR}$ represents the tire lateral force of the rear axle,
$I_z$ represents the vehicle rotation moment of inertia,
$\ddot{\psi}$ represents the yaw acceleration, and
k represents a discrete time sequence.

The yaw acceleration as an input factor may be derived from unit 60, whereas the lateral acceleration as input factor may be derived from detection means 36, for example. Furthermore, also vehicle parameters 54 are provided as input factors for the estimation unit 62.

An error determination unit 64 determines an error vector of the lateral forces between the lateral force value estimated by the tire dynamics model of unit 58 on the one hand and the lateral dynamics model of unit 62 on the other hand. An observer gain L is multiplied to the error vector and used as an input value or input vector for unit 62. That is, the observer gain L multiplied by the error vector may provide a correction value or correction vector, respectively, which is used to correct the estimation of the vehicle lateral force by unit 58 in the next sampling time sequence.

Figure 4:
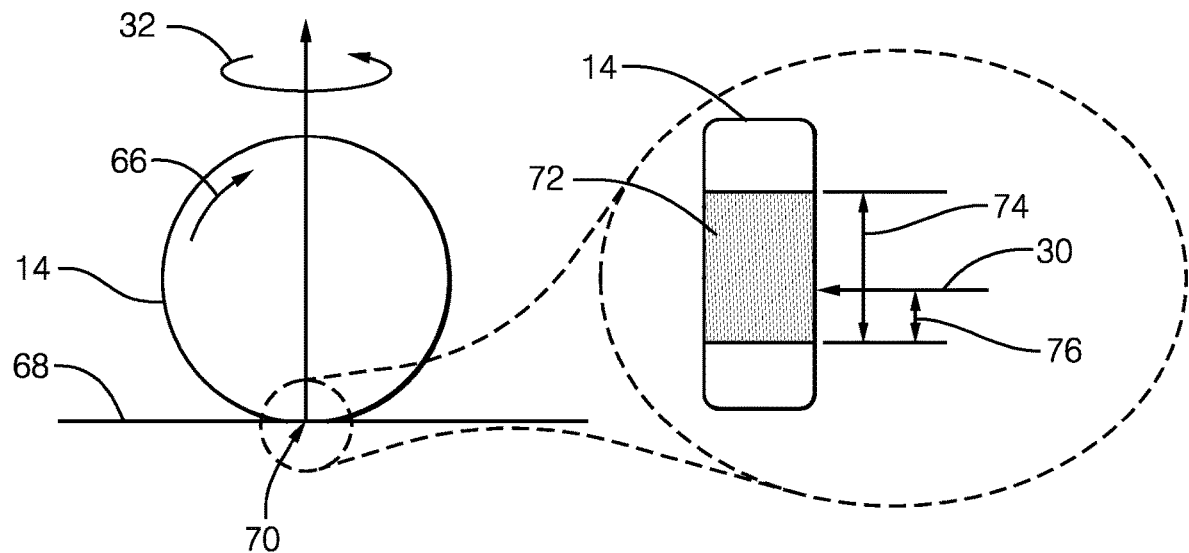
FIG. 4 shows a schematic illustration of a contact patch between a vehicle tire and a road surface.

The estimation unit 48 indicated in FIG. 2 is configured to estimate a pneumatic trail. The pneumatic trail is illustrated in greater detail in FIG. 4. The left-hand side of FIG. 4 illustrates a side view of a road wheel 14 rolling in direction 66. A contact point between the road wheel 14 and a road surface 68 is indicated with numeral 70. A detailed view of the contact point 70 is shown on the right-hand side of FIG. 4. A lateral force 30 as well as a contact patch 72, which is present between the road wheel 14 and the road surface 68, is shown. The contact patch 72 may have a length a which is denoted with numeral 74. The size of the contact patch 72 and therewith its length 74 is dependent on the tire characteristics, and properties such as air pressure or tire size. It is possible to estimate a value of the pneumatic trail 76 when the tire slip angle is small.

The step of estimating the pneumatic trail may, in particular, be conducted on the basis of a pneumatic trail model, which is, for example, based on the equation:

$$t_p = -\left(\frac{T_{SAT}}{F_y}\right)_{\alpha \to 0} = \frac{1}{3}a$$

where
$t_p$ represents the pneumatic trail,
$T_{SAT}$ represents the self-aligning torque,
$F_y$ represents the corrected lateral force, and
a represents the length of the contact surface between tire and road in a longitudinal orientation of the tire.

The estimation unit 50 indicated in FIG. 2 is configured to estimate a self-aligning torque. The self-aligning torque may be computed by the product of the corrected vehicle lateral force, estimated by estimation unit 46 and the pneumatic trail, estimated by estimation unit 48. In particular, the following equation may be applied:

$$T_{sat} \approx F_y \cdot t_p$$

where
$T_{sat}$ represents the self-aligning torque,
$F_y$ represents the corrected vehicle lateral force, and
$t_p$ represents the pneumatic trail.

Figure 5:
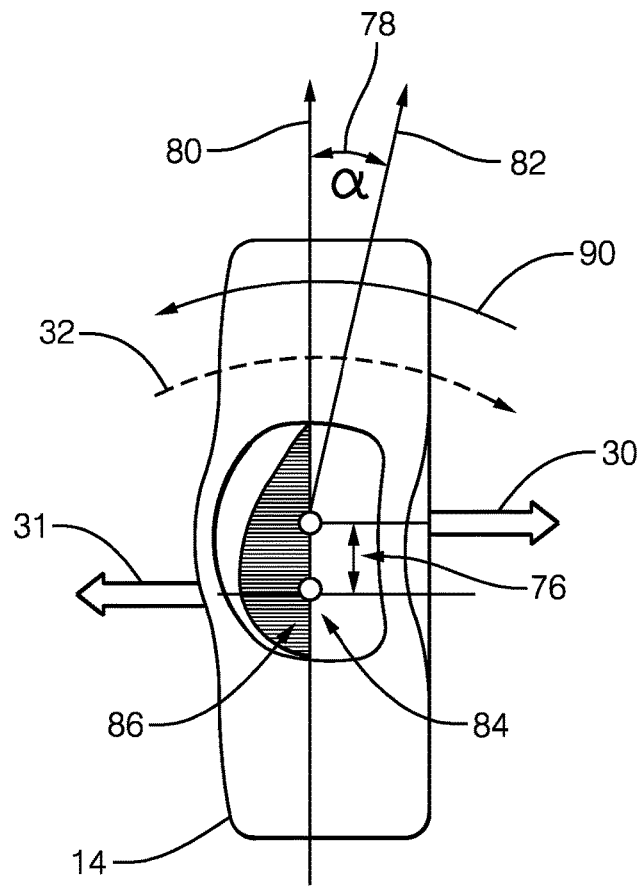
FIG. 5 shows a schematic illustration of the relationship between the tire lateral force, pneumatic trail, and self-aligning torque during cornering.

The relationship between the vehicle lateral force, pneumatic trail, and self-aligning torque during cornering is illustrated in FIG. 5. It may be comprehended that a lateral force 30 is present on the wheel, resulting in a counter lateral force 31 as well as a self-aligning torque 32. A slip angle $\alpha$ is denoted with numeral 78. The direction, into which the wheel points, is denoted with numeral 80, whereas the direction of motion is denoted with numeral 82. The center of pressure is denoted with numeral 84 and the pressure distribution with numeral 86.

In order to control a vehicle while cornering, the torque 90 that a vehicle requires has to be at least sufficient to correct the tire slip angle 78. In other words, the torque 90 has to be at least at the same level of the self-aligning torque 32. Accordingly, the desired torque 28 at the steering wheel 12 may be estimated on the basis of the self-aligning torque 32.

Figure 6B:
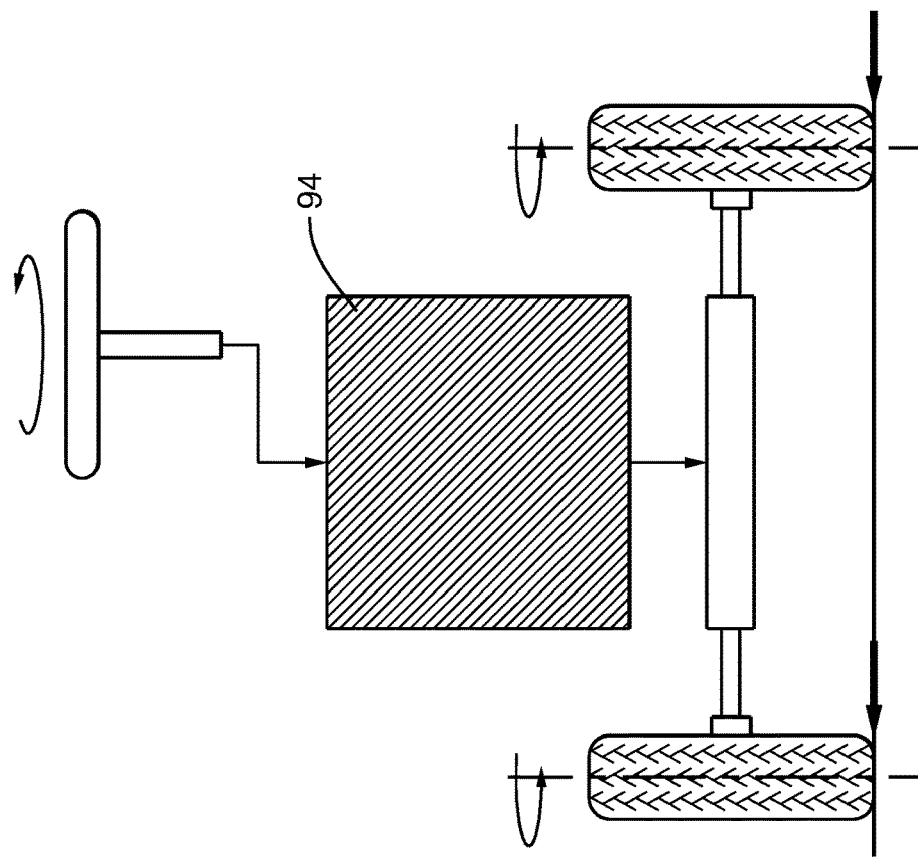
FIG. 6b shows a schematic illustration of a vehicle steering system with the electro-mechanical system between tires and steering wheel being represented by a model.
Figure 6A:
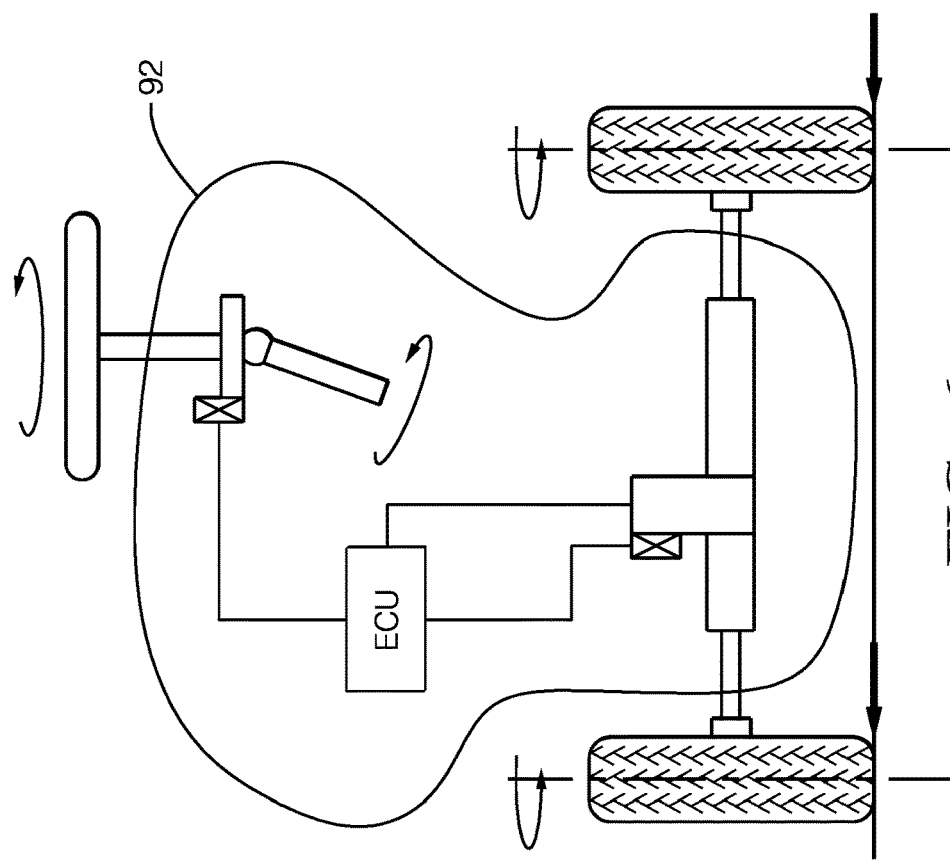
FIG. 6a shows a schematic illustration of a vehicle steering system with an electro-mechanical system between tires and steering wheel being highlighted.

The estimation unit 52 indicated in FIG. 2 is configured to estimate a self-aligning torque on the basis of a steering model. The steering model may represent a mechanical and/or electro-mechanical system between the tires and the steering wheel of a vehicle. The mechanical or electro-mechanical system as a whole is denoted with numeral 92 in FIG. 6a. The steering model may comprise a first order system 94, which is shown in schematically FIG. 6a. The first order system may be a first order lag system. Also a higher order system may be applied. In the first order system, for example, two free parameters may be present, namely the power steering ratio, which is typically a fix value and simple to obtain, and the pole location of the steering system. A driver may perform a final adjustment to the first order system in view of the pole location, in order to meet respective requirements, such as the steady state, response time, and/or improve the performance of such system. The system may be tuned by testing.

While this invention has been described in terms of the preferred embodiments thereof, it is not intended to be so limited, but rather only to the extent set forth in the claims that follow.

I claim:

1. A method for estimating a steering torque for lateral control of a vehicle, said method comprising:
    detecting at least one signal on a current vehicle state or current vehicle environment;
    determining a desired steering angle ($\delta$) by a steering control unit based on the at least one detected signal;
    estimating a first vehicle lateral force value using a tire dynamics model, including the desired steering angle ($\delta$) as an input factor, the tire dynamics model being a function of a tire slip angle ($\alpha_F$, $\alpha_R$) for the vehicle and road conditions of the current vehicle environment;
    estimating a yaw acceleration ($\ddot{\psi}$) of the vehicle using a backward Euler method, the backward Euler method using an equation:

$$\ddot{\psi}(k) = \frac{\dot{\psi}(k) - \dot{\psi}(k-1)}{T_s},$$

where
$\ddot{\psi}$ represents the yaw acceleration,
$\dot{\psi}$ represents a yaw rate,
$T_s$ represents a sampling period or resolution, and
k represents a discrete time sequence;
    estimating a second vehicle lateral force value using a lateral dynamics model, the lateral dynamics model being a function of a mass of the vehicle, a lateral acceleration of the vehicle, the yaw acceleration ($\ddot{\psi}$) of the vehicle, and a rotation moment of inertia for the vehicle, the lateral dynamics model being a single track model based on equations:

$$Ma_y(k) = F_{yF}(k) + F_{yR}(k)$$

and $$I_Z\ddot{\psi}(k) = l_F F_{yF}(k) - l_R F_{yR}(k),$$

where
M represents the mass of the vehicle,
$a_y$ represents the lateral acceleration of the vehicle,
$F_{yF}$ represents a tire lateral force of a front axle of the vehicle,
$F_{yR}$ represents a tire lateral force of a rear axle of the vehicle,
$I_z$ represents the rotation moment of inertia of the vehicle,
$\ddot{\psi}$ represents the yaw acceleration of the vehicle, and
k represents a discrete time sequence;
    correcting the first vehicle lateral force value using the second vehicle lateral force value;
    estimating a self-aligning torque based on the corrected first vehicle lateral force value;
    estimating a steering torque from the estimated self-aligning torque; and
    applying the estimated steering torque to a steering system of the vehicle.

2. The method according to claim 1, wherein the method further comprises:
    estimating the tire slip angle ($\alpha_F$, $\alpha_R$), wherein the desired steering angle ($\delta$) provides an input factor for said tire slip angle estimation and estimating the first vehicle lateral force value using the tire dynamics model includes the tire slip angle ($\alpha_F$, $\alpha_R$) as an input factor.

3. The method according to claim 2, wherein the step estimating the tire slip angle ($\alpha_F$, $\alpha_R$) uses a slip angle model, which is based on equations:

$$\alpha_F(k) = -\beta(k) + \delta_w(k) - \frac{l_F \dot{\psi}(k)}{v_x(k)}$$

and $$\alpha_R(k) = -\beta(k) + \frac{l_R \dot{\psi}(k)}{v_x(k)}$$

where
$\alpha_F$ represents the tire slip angle of a front axle of the vehicle,
$\alpha_R$ represents the tire slip angle of a rear axle of the vehicle,
$\beta$ represents an angle of the vehicle relative to a travel direction of the vehicle, $\delta_w$ represents the desired steering angle,
$l_F$ represents the distance between a vehicle center of gravity and the front axle,
$l_R$ represents the distance between a vehicle center of gravity and the rear axle,
$\dot{\psi}$ represents a yaw rate, and
$v_x$ represents a vehicle longitudinal velocity, and
k represents a discrete time sequence.

4. The method according to claim 1, wherein the tire dynamics model is a Pacejka model based on equations:

$$\hat{F}_{yF}(k)=D \sin(C \tan^{-1}(B\alpha_F-E(B\alpha_F-\tan^{-1}(B\alpha_F))))$$

and $$\hat{F}_{yR}(k)=D \sin(C \tan^{-1}(B\alpha_R-E(B\alpha_R-\tan^{-1}(B\alpha_R)))),$$

where
$\hat{F}_{yF}$ represents a tire lateral force of a front axle of the vehicle,
$\hat{F}_{yR}$ represents the tire lateral force of a rear axle of the vehicle,
$\alpha_F$ represents the tire slip angle of the front axle,
$\alpha_R$ represents the tire slip angle of the rear axle,
k represents a discrete time sequence, and
B, C, D and E represent fitting coefficients based on the road conditions of the current vehicle environment and obtained offline.

5. The method according to claim 1, wherein estimating the second vehicle lateral force value using the lateral dynamics model is conducted independent from the desired steering angle ($\delta$).

6. The method according to claim 1, wherein correcting the first vehicle lateral force value is conducted by a linear observer.

7. The method according to claim 1, wherein correcting the first vehicle lateral force value comprises detecting an error value between the first vehicle lateral force value and the second vehicle lateral force value and multiplying the error value by an observer gain (L) for receiving a correction value, wherein the correction value is used to correct the first vehicle lateral force value in a subsequent sampling time.

8. The method according to claim 1, wherein the method further comprises:
estimating a pneumatic trail ($t_p$), wherein estimating the self-aligning torque includes the pneumatic trail ($t_p$) as an input factor.

9. The method according to claim 8, wherein estimating the pneumatic trail ($t_p$) is conducted using a pneumatic trail model, which is based on an equation:

$$t_p = -\left(\frac{T_{SAT}}{F_y}\right)_{a\to 0} = \frac{1}{3}a,$$

where
$t_p$ represents the pneumatic trail,
$T_{SAT}$ represents a self-aligning torque,
$F_y$ represents a corrected lateral force, and
a represents a length of a contact surface between a tire and a road in a longitudinal orientation.

10. The method according to claim 1, wherein the steering torque is derived from the self-aligning torque using a steering model, which represents a mechanical or electro-mechanical system between tires of the vehicle and a steering wheel of the vehicle.

11. The method according to claim 10, wherein the steering model comprises a first order lag system.

12. A device for estimating a steering torque for lateral control of a vehicle, said device comprising:
a detecting means for detecting at least one signal on a current vehicle state or current vehicle environment;
a control unit for determining a desired steering angle ($\delta$) based on the at least one detected signal;
a first estimation unit for estimating a first vehicle lateral force value using a tire dynamics model, including the desired steering angle ($\delta$) as an input factor, the tire dynamics model being a function of a tire slip angle ($\alpha_F$, $\alpha_R$) for the vehicle and road conditions of the current vehicle environment;
a second estimation unit configured to:
estimating a yaw acceleration ($\ddot{\psi}$) of the vehicle using a backward Euler method, the backward Euler method using an equation:

$$\ddot{\psi}(k) = \frac{\dot{\psi}(k) - \dot{\psi}(k-1)}{T_s},$$

where
$\ddot{\psi}$ represents the yaw acceleration,
$\dot{\psi}$ represents a yaw rate,
$T_s$ represents a sampling period or resolution, and
k represents a discrete time sequence;
estimate a second vehicle lateral force value using a lateral dynamics model, the lateral dynamics model being a function of a mass of the vehicle, a lateral acceleration of the vehicle, the yaw acceleration ($\ddot{\psi}$) of the vehicle, and a rotation moment of inertia for the vehicle, the lateral dynamics model being a single track model based on equations:

$$Ma_y(k)=F_{yF}(k)+F_{yR}(k)$$

and $$I_Z\ddot{\psi}(k)=l_FF_{yF}(k)-l_RF_{yR}(k),$$

where
M represents the mass of the vehicle,
$a_y$ represents the lateral acceleration of the vehicle,
$F_{yF}$ represents a tire lateral force of a front axle of the vehicle,
$F_{yR}$ represents a tire lateral force of a rear axle of the vehicle,
$I_z$ represents the rotation moment of inertia of the vehicle,
$\ddot{\psi}$ represents the yaw acceleration of the vehicle, and
k represents a discrete time sequence;
a correction unit for correcting the first vehicle lateral force value using the second vehicle lateral force value;
a third estimating unit for estimating a self-aligning torque based on the corrected first vehicle lateral force value;
a fourth estimating unit for estimating the steering torque from the estimated self-aligning torque; and
a steering system configured to apply the steering torque to the vehicle.

13. The device according to claim 12, wherein the first estimation unit is configured to estimate the tire slip angle ($\alpha_F$, $\alpha_R$), wherein the desired steering angle ($\delta$) provides an input factor for said tire slip angle estimation and an estimation of the first vehicle lateral force value using the tire dynamics model includes the estimated tire slip angle ($\alpha_F$, $\alpha_R$) as an input factor.

14. The device according to claim 12, wherein an estimation of the second vehicle lateral force value using the lateral dynamics model is conducted independent from the desired steering angle ($\delta$).

15. The device according to claim 12, wherein a correction of the first vehicle lateral force value is conducted by a linear observer.

16. The device according to claim 12, wherein a correction of the first vehicle lateral force value comprises detecting an error value between the first vehicle lateral force value the second vehicle lateral force value and multiplying the error value by an observer gain (L) for receiving a correction value, wherein the correction value is used to correct the first vehicle lateral force value in a subsequent sampling time.

17. The device according to claim 13, wherein estimation of the tire slip angle ($\alpha_F$, $\alpha_R$) uses a slip angle model, which is based on equations:

$$\alpha_F(k) = -\beta(k) + \delta_w(k) - \frac{l_F \dot{\psi}(k)}{v_x(k)}$$

and $$\alpha_R(k) = -\beta(k) + \frac{l_R \dot{\psi}(k)}{v_x(k)}$$

where
  $\alpha_F$ represents the tire slip angle of the front axle,
  $\alpha_R$ represents the tire slip angle of the rear axle,
  $\beta$ represents an angle of the vehicle relative to a travel direction of the vehicle,
  $\delta_w$ represents the desired steering angle,
  $l_F$ represents the distance between a vehicle center of gravity and the front axle,
  $l_R$ represents the distance between the vehicle center of gravity and the rear axle,
  $\dot{\psi}$ represents a yaw rate, and
  $v_x$ represents a vehicle longitudinal velocity, and
  k represents a discrete time sequence.

18. The method according to claim 12, wherein the tire dynamics model is a Pacejka model based on equations:

$$\hat{F}_{yF}(k) = D \sin(C \tan^{-1}(B\alpha_F - E(B\alpha_F - \tan^{-1}(B\alpha_F))))$$

and $$\hat{F}_{yR}(k) = D \sin(C \tan^{-1}(B\alpha_R - E(B\alpha_R - \tan^{-1}(B\alpha_R)))),$$

where
  $\hat{F}_{yF}$ represents a tire lateral force of a front axle of the vehicle,
  $\hat{F}_{yR}$ represents the tire lateral force of a rear axle of the vehicle,
  $\alpha_F$ represents the tire slip angle of the front axle,
  $\alpha_R$ represents the tire slip angle of the rear axle,
  k represents a discrete time sequence, and
  B, C, D and E represent fitting coefficients based on the road conditions of the current vehicle environment and obtained offline.

19. The device according to claim 12, wherein the steering torque is derived from the self-aligning torque using a steering model, which represents a mechanical or electro-mechanical system between tires of the vehicle and a steering wheel of the vehicle.

20. The device according to claim 19, wherein the steering model comprises a first order lag system.

* * * * *